(12) United States Patent  
Pomaranski et al.

(10) Patent No.: US 7,409,576 B2  
(45) Date of Patent: Aug. 5, 2008

(54) HIGH-AVAILABILITY CLUSTER WITH PROACTIVE MAINTENANCE

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/935,941

(22) Filed: Sep. 8, 2004

(65) Prior Publication Data

US 2006/0053337 A1 Mar. 9, 2006

(51) Int. Cl.  
*G06F 11/00* (2006.01)

(52) U.S. Cl. .......................................... 714/3

(58) Field of Classification Search ............... 714/3, 714/47  
See application file for complete search history.

(56) References Cited

U.S. PATENT DOCUMENTS

| | | | |
|---|---|---|---|
| 5,553,058 A * | 9/1996 | Glitho | 370/248 |
| 6,389,551 B1 | 5/2002 | Yount | |
| 6,594,784 B1 * | 7/2003 | Harper et al. | 714/47 |
| 6,601,084 B1 * | 7/2003 | Bhaskaran et al. | 718/105 |
| 6,609,213 B1 * | 8/2003 | Nguyen et al. | 714/4 |
| 6,922,791 B2 * | 7/2005 | Mashayekhi et al. | 714/4 |
| 2002/0087612 A1 * | 7/2002 | Harper et al. | 709/100 |
| 2002/0087913 A1 * | 7/2002 | Harper et al. | 714/15 |
| 2003/0105867 A1 | 6/2003 | Colrain et al. | |
| 2003/0158933 A1 | 8/2003 | Smith | |
| 2006/0048017 A1 * | 3/2006 | Anerousis et al. | 714/47 |
| 2007/0277058 A1 * | 11/2007 | Bae et al. | 714/47 |

FOREIGN PATENT DOCUMENTS

| | | |
|---|---|---|
| JP | 61-233845 | 10/1986 |
| JP | 05-165669 | 7/1993 |
| JP | 09-330245 | 12/1997 |
| JP | 11-203157 | 7/1999 |
| JP | 2004-062470 | 2/2004 |

OTHER PUBLICATIONS

Kim, Sungsoo; Park, Nohpill; Lombardi, Fabrizio. Modeling Testing-Strategies for Yield Enhancement of Multichip Module Systems. Jun. 1997. IEEE Transactions on Reliability. vol. 46, No. 2. pp. 184-192.*

Leangsuksun, et al., "A Failure Predictive and Policy-Based High Availability Strategy for Linux High Performance Computing Cluster". May 17-20, 2004. [online] [Retrieved on Sep. 22, 2005]. Retrieved from the Internet: <URL:http://www.linuxclustersinstitute.org.Linux-HPC-Revolution/Archive/2004techpapers.html>.

Patent Office of the United Kingdom, Patent Act 1977: Search Report under Section 17 for Application No. GB0516362.1.

"Notice of Rejection" from Japan Patent Office for Patent Application No. 2005-244228, Nov. 14, 2006, 3 sheets.

"Decision of Refusal" from Japan Patent Office for Patent Application No. 2005-244228, Oct. 29, 2007, 2 sheets.

* cited by examiner

*Primary Examiner*—Gabriel Chu  
*Assistant Examiner*—Paul F Contino

(57) ABSTRACT

One embodiment disclosed relates to a method of preventative maintenance of a high-availability cluster. A least-recently-tested active node is determined. The least-recently-tested active node is swapped out from the HA cluster, and a stand-by node is swapped into the HA cluster. Other embodiments are also disclosed.

18 Claims, 6 Drawing Sheets

400

US 7,409,576 B2

HIGH-AVAILABILITY CLUSTER WITH PROACTIVE MAINTENANCE

FIELD OF THE INVENTION

The present disclosure relates generally to computer networks. More particularly, the present disclosure relates to clusters of interconnected computer systems.

DESCRIPTION OF THE BACKGROUND ART

A cluster is a parallel or distributed system that comprises a collection of interconnected computer systems or servers that is used as a single, unified computing unit. Members of a cluster are referred to as nodes or systems. The cluster service is the collection of software on each node that manages cluster-related activity.

Clustering may be used for parallel processing or parallel computing to simultaneously use two or more processors to execute an application or program. Clustering is a popular strategy for implementing parallel processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. If one server suffers an unexpected software or hardware failure, another clustered server may assume the operations of the failed server. Thus, if any hardware of software component in the system fails, the user might experience a performance penalty, but will not lose access to the service.

Current cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS supports the clustering of two NT servers to provide a single highly available server.

It is desirable to improve apparatus and methods for high-availability (HA) clusters. It is particularly desirable to make HA clusters more robust and increase uptime for such clusters.

SUMMARY

One embodiment disclosed relates to a method of preventative maintenance of a high-availability cluster. A least-recently-tested active node is determined. The least-recently-tested active node is swapped out from the HA cluster, and a stand-by node is swapped into the HA cluster.

Another embodiment pertains to a high-availability cluster apparatus including a plurality of computing nodes of said cluster and a cluster master communicatively connected to each of the nodes. Non-volatile memory associated with the cluster master is configured to store data keeping track of quality measures of the nodes. Data keeping track of freshness measures of the nodes may also be stored.

Another embodiment pertains to a method of pro-actively maintaining a high-availability cluster having a plurality of nodes. The method includes keeping track of status variables, quality measures, and freshness measures for the nodes.

DETAILED DESCRIPTION

A highly disadvantageous event for a high-availability cluster is having a participating node of the cluster "drop-out" unexpectedly. First, such a drop-out takes precious time to notice and verify that a node has disappeared. Secondly, an unexpected drop-out is highly risky to the uptime of the HA cluster, as there is a finite probability of some "glitch" (sudden interruption of function) occurring during the drop-out which could cause the failure of applications to "switchover" to the backup nodes correctly.

Conventional implementations of HA clusters deal only with nodes after they have already failed or been disconnected from the cluster. Furthermore, the quality of spare or underutilized nodes are not tracked after the HA cluster has been up for a period of time. Moving resources to these nodes may be dangerous to the operational health of the HA cluster.

An aspect of the present invention relates to reducing the chances of a participating node of a cluster from unexpectedly dropping-out. Instead of unexpected drop-outs, controlled or expected switchovers are much more desirable. This is because it is much easier to move applications off of a running system, rather than one that has "disappeared" from the HA cluster. Furthermore, controlled switchovers can be made to occur at the convenience of the operator, such as, for example, when the HA cluster is operating at a less critical time of the day.

Apparatus and methods are disclosed herein to make an HA cluster more robust by performing proactive maintenance on cluster nodes. It is expected that such proactive maintenance may result in significant reductions in unexpected outages of nodes, and therefore greater uptime for the HA cluster in total.

The proactive maintenance provided by the hardware system and software algorithms discussed below provides a means to safely assure the quality of nodes in an HA cluster. The quality assurance applies to both active and stand-by nodes and is handled at the cluster level, resulting in added robustness. In addition, the "freshness" of a quality-assured node is advantageously tracked and used, resulting in greater cluster uptime with less risk. With such proactive maintenance, failures can be anticipated and dealt with before a node or system crash occurs. Moreover, the impact on cluster level performance is advantageously minimized by swapping each node out of the active cluster prior to running functional/electrical tests on it.

Figure 1:
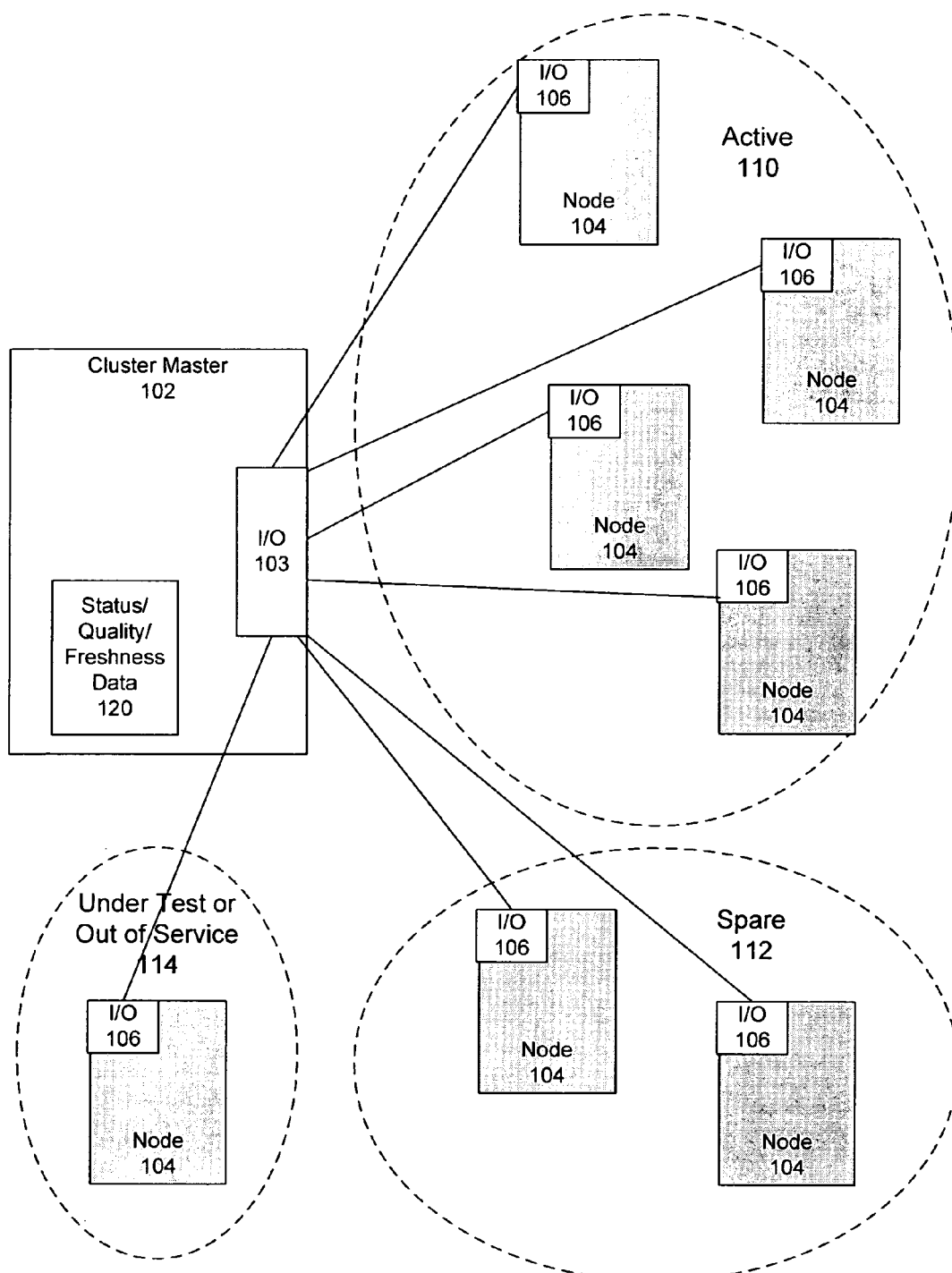
FIG. 1 is a schematic diagram of a high-availability cluster in accordance with an embodiment of the invention.

FIG. 1 is a schematic diagram of a high-availability cluster in accordance with an embodiment of the invention. The HA cluster includes a cluster master 102 and multiple nodes 104.

In one implementation, the cluster master 102 is a separate computing system that may communicate with the nodes 104 via point-to-point links (as depicted in FIG. 1) or via a data communications network (such as an Ethernet type network, a mesh network, or other network). In the case of point-to-point links, an input/output (I/O) system of the cluster master 102 may communicate via links to I/O cards 106 at each of the nodes 104. The I/O card 106 for a node 104 may be implemented as a simple network card (for example, a conventional Ethernet card), or as a microprocessor-based "smart" network card with built in functionality to handle a portion of the cluster management for that node.

In an alternate implementation, the cluster master 102 may be implemented as a distributed application that runs across the nodes 104 in the HA cluster. In this implementation, the cluster master 102 may have specific memory allocated to or associated with it at each node 104. The allocated memory may include non-volatile memory and may also include volatile memory.

The nodes 104 may be grouped into different sets based on their status. Nodes 104 that are actively being used as part of the operating cluster have an "active". status 110. Nodes 104 that are not actively being used as part of the operating cluster, but that are available to swap into the active cluster, have a "stand-by" or "spare" status 112. Inactive nodes that are unavailable to be swapped into the cluster may have a status indicating they are either "under test" or "out-of-service" 114. In one implementation, the status data may be stored in non-volatile memory 120 allocated to the cluster master 102.

As discussed further below, the cluster master 102 may be configured to keep track of the quality (operational health) of the cluster nodes 104. The quality-related information may include, for example, the node error rate, critical performance parameters or measurements, the chassis code output, and any IPMI (Intelligent Platform Management Interface) events coming from each node. Based on such information, each node in the cluster may be assigned a quality rank or measure. In addition, the cluster master 102 may be configured to keep track of the freshness of the nodes 104. The freshness relates to how recently that node has had a quality check. Each node may be assigned a freshness rank or measure, where the "freshest" node is one that has just gone through, and passed, a thorough testing procedure by the cluster master 102. Both the quality and freshness data may be stored in non-volatile memory 120 allocated to the cluster master 102.

Also discussed further below, the cluster master 102 may proactively take a specific node 104 out of the set of active nodes 110 of the HA cluster so as to perform diagnostic testing on the node 104. This may happen if the node's current health is below an acceptable level, and/or if it is that node's turn to get tested. The cluster master 102 also coordinates the movement of critical applications off the node 104 which is going to be removed from the active node set 110.

In accordance with an embodiment of the invention, the cluster master 102 is configured to perform various tasks. These tasks may include a "gather data" task discussed below in relation to FIG. 2, a "quality check" task discussed below in relation to FIGS. 3A and 3B, and a "perform preventative maintenance" task discussed below in relation to FIGS. 4A and 4B. Each of these tasks may be performed periodically, and the periodicity or cycle rate for each task may be individually configurable.

In accordance with an embodiment of the invention, each node 104 has a status that may be either "active", "spare" (or standby), "under test", or "under repair" (or out-of-service). A node under repair is unavailable to the HA cluster and unavailable to the cluster master 102.

A node that is "under repair" may be moved back into the spare resource pool 112 after the node is repaired. (by physically replacing bad hardware, doing a reconfiguration, etc.). This may be done by manually or automatically changing the status from "under repair" to "ready to be tested" after the repair is done. The Cluster Master 102 may then determine the viability of the node through a series of tests or status checks, set its quality level, then move the node into the resource pool 112 by changing the status of the node to the spare (or stand-by) status if the quality level is sufficient (in other words, if the tests are passed). This method advantageously prevents potential bad nodes from entering the resource pool 112.

A similar process may be used for new nodes entering the cluster. A new node may have its status set to a ready-to-be-tested status. Functional tests may then be applied to the new node, and a quality measure for the node set based on results of the tests. The new node may then be placed in the resource pool 112 by changing the status of the node to the spare (or stand-by) status if the quality level is sufficient (in other words, if the tests are passed). This process advantageously prevents potential bad nodes from entering the resource pool 112.

Figure 2:
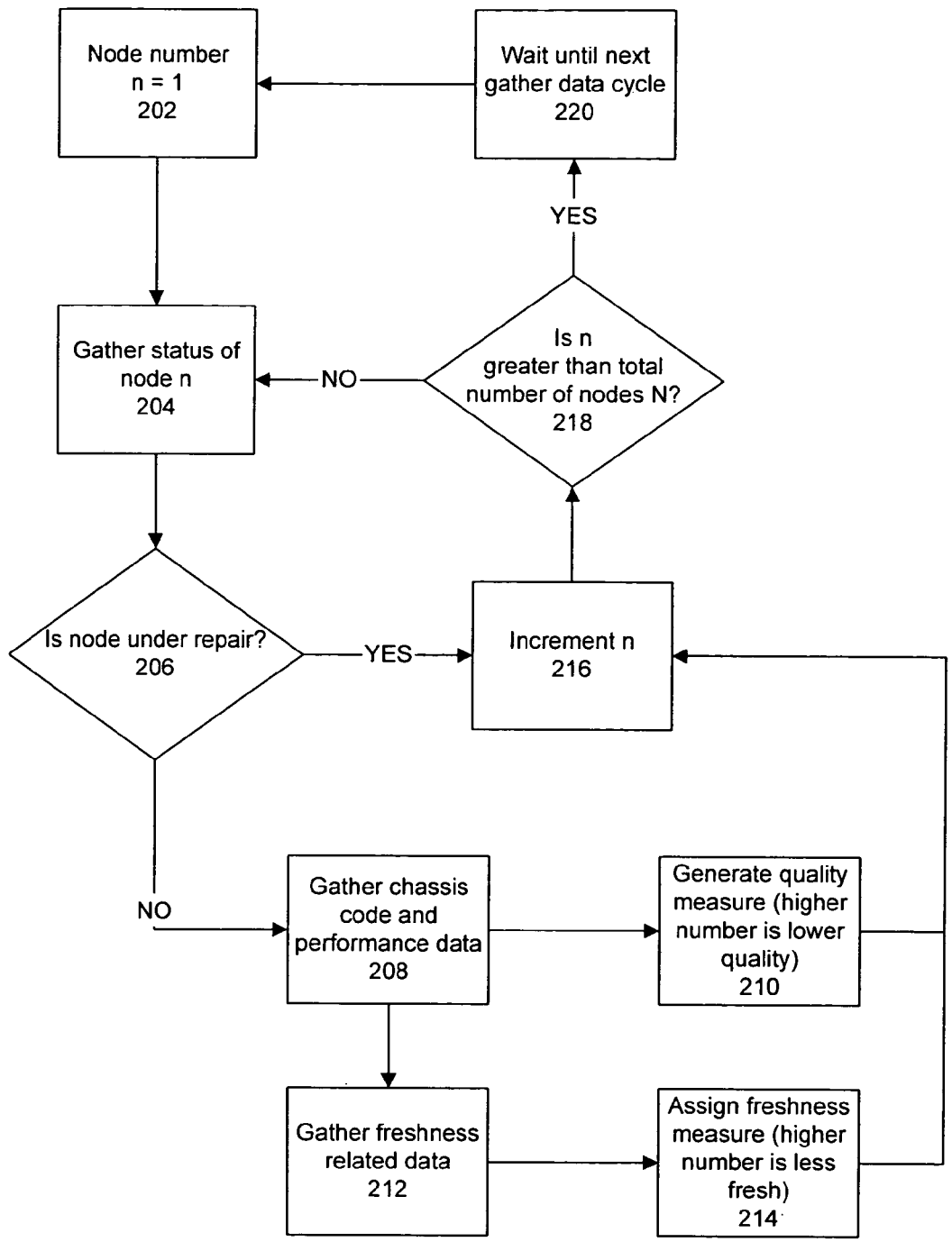
FIG. 2 is a flow chart depicting a method of gathering maintenance-related data in accordance with an embodiment of the invention.

FIG. 2 is a flow chart depicting a method (200) of gathering maintenance-related data in accordance with an embodiment of the invention. These gathered data may be stored in data storage 120 associated with the cluster master 102. A cycle of this "gather data" task (200) may be periodically (220) performed by the cluster master 102. The frequency of performance of the gather data task may be configurable.

For each task cycle, the method (200) goes through all the nodes 104. The node 104 assigned the number 1 is set (202) to be the first in the illustrated example of FIG. 2, but other orders of the nodes may be followed instead. For each node "n", the status is gathered (204) by communications between the cluster master 102 and that node 104. If the status indicates that the node n is "under repair" (out-of-service) (206), then the process moves on to the next node. Moving onto the next node may involve, for example, incrementing (216) the node number n, and gathering the status data from the next node (204), so long as there are more nodes from which to gather data (218).

If the status indicates that the node n is not under repair (i.e. that it is either active, or a spare, or under test) (206), then the cluster master 102 gathers further data from the node n. The gathering of further data includes gathering quality-related data (208) and freshness-related data (212), not necessarily in that order. The quality-related data may include, for example, a chassis code from node n and performance data. Using the quality-related data, a quality measure or ranking may be generated (210). In one implementation, a higher number for the quality measure indicates a lower quality of the node. Using the freshness-related data, a freshness measure or ranking may be generated (214). In one implementation, a higher number for the freshness measure indicates that a node is less "fresh". Of course, other implementations of the quality and freshness measures are also possible. For example, a lower number for the quality measure may indicate a lower quality of the node, and a lower number for the freshness measure may indicate a less fresh node.

Figure 3A:
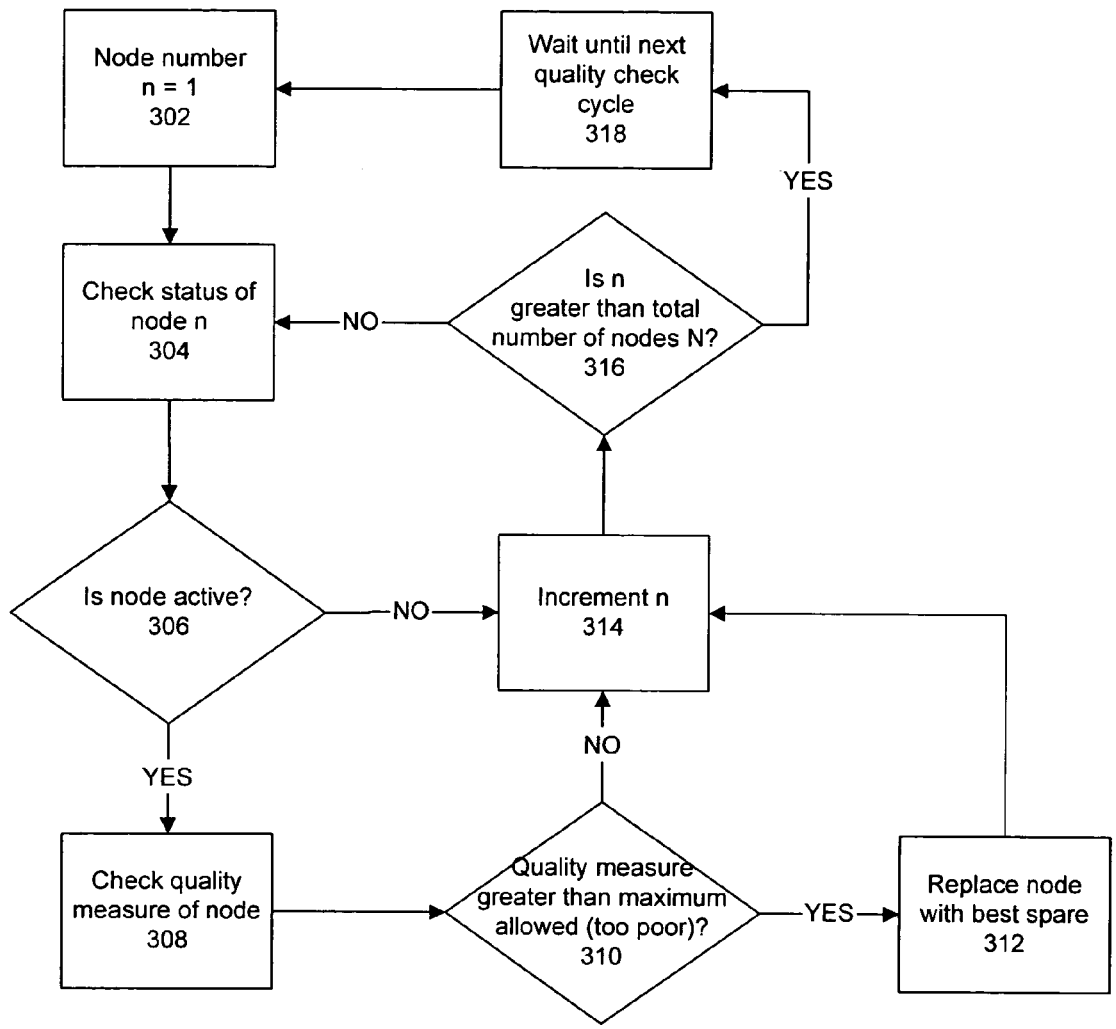
FIG. 3A is a flow chart depicting a method of proactively checking the quality of active nodes in accordance with an embodiment of the invention.

FIG. 3A is a flow chart depicting a method of proactively checking the quality of active nodes 110 in accordance with an embodiment of the invention. A cycle of this "quality check" task (300) may be periodically (318) performed by the cluster master 102. The frequency of performance of the quality check task may be configurable.

For each task cycle, the method (300) goes through all the nodes 104. The node 104 assigned the number 1 is set (302) to be the first in the illustrated example of FIG. 3, but other orders of the nodes may be followed instead. For each node "n", the status is checked (304) by examining the status data stored in the data storage 120 associated with the cluster master 102. If the status indicates that the node n is not "active" (306), then the process moves on to the next node. Moving onto the next node may involve, for example, incrementing (314) the node number n and checking status of the next node (304), so long as there are more nodes to check (316).

If the status indicates that the node n is active (306), then the cluster master 102 checks (308) the quality measure for the node n as stored 120. If the quality measure does not exceed a maximum allowed measure (310), then the method (300) moves onto the next node, for example, by incrementing n (314). If the quality measure is greater than the maximum allowed measure (310), then node n is replaced with a "best" spare node (312). In other words, the node n is replaced (312) with the best-available spare node if the node n is deemed (310) to have an unsatisfactorily poor quality measure. A procedure for this replacement (312) is discussed in further detail below in relation to FIG. 3B. After the replacement (312), the method (300) moves onto the next node, for example, by incrementing n (314) and checking status of the next node (304), so long as there are more nodes to check (316).

In an alternate embodiment, the quality check task may replace an active node so long as there is a better spare node available. Such a method may involve comparing the quality measure for each active node with that of the best-available spare node. If the quality measure is poorer for the active node, then the active node is replaced in the cluster by the best-available spare node.

Figure 3B:
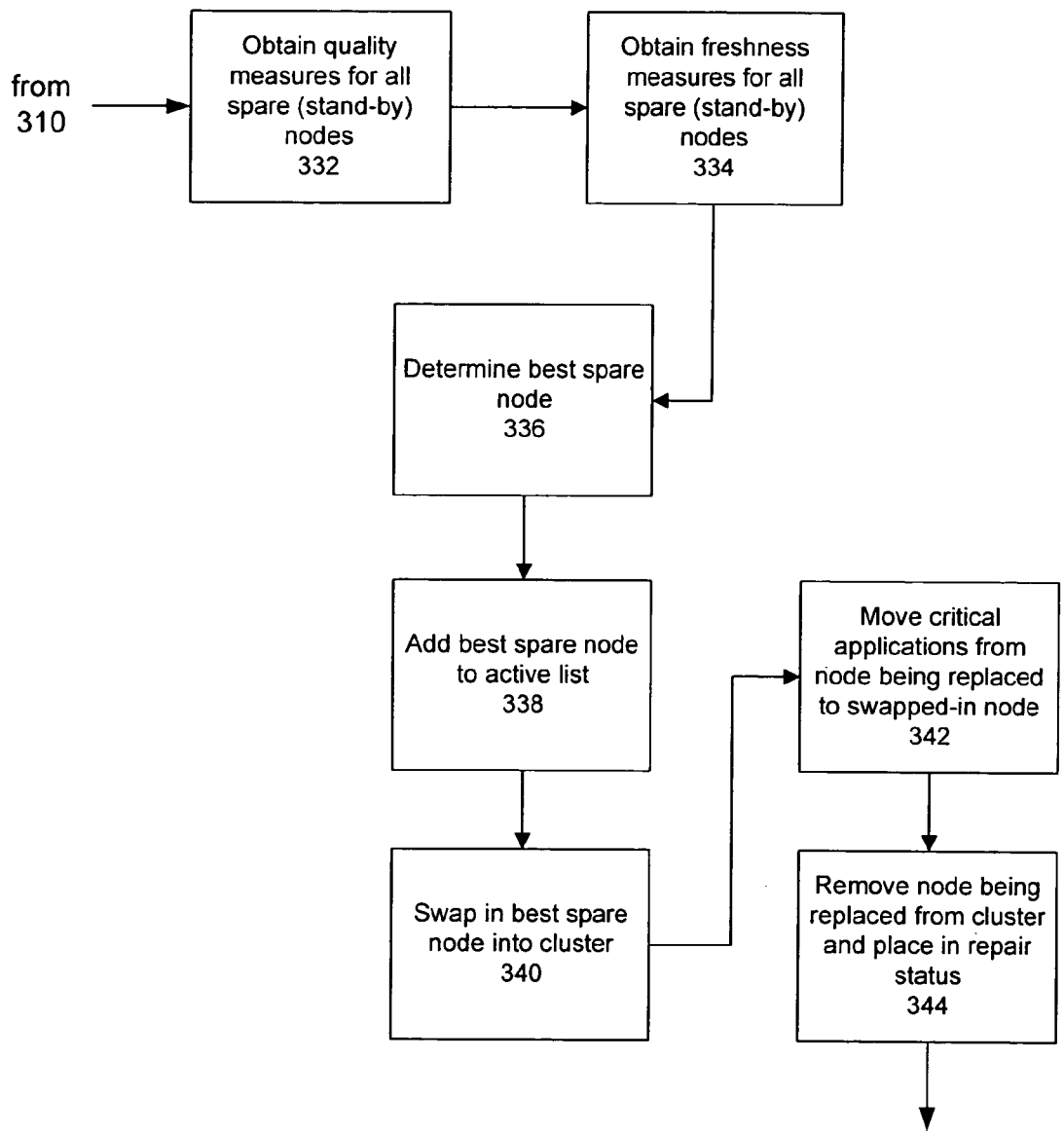
FIG. 3B is a flow chart depicting a procedure for replacing a low-quality node in accordance with an embodiment of the invention.

FIG. 3B is a flow chart depicting a procedure for replacing (312) an active node of low quality in accordance with an embodiment of the invention. Quality measures (332) and freshness measures (334) are obtained by the cluster master 102 from the stored quality/freshness data 120 for all spare (standby) nodes 112. While FIG. 3B depicts the quality measures being obtained first, then the freshness measures being obtained, the measures may be obtained not necessarily in that order.

Using the quality and freshness data, a determination is made as to the "best" spare node (336). This determination may be made using various techniques or formulas. For example, the best spare node may be the spare node that is the most fresh with a satisfactory quality measure, where the satisfactory quality measure is no greater than a maximum allowable. As another example, the best spare node may be the spare node that is of best quality with a satisfactory freshness, where a satisfactory freshness measure is no greater than a maximum allowable. As another example, the quality and freshness measures may be averaged for each spare node, and the spare node with the lowest average (best combined quality and freshness) may be chosen. The averaging may be weighted in favor of either the quality or the freshness measure. Other formulas may also be used.

Once the best spare node has been determined (336), the best spare node may be added (338) to the active list of the cluster and then swapped (340) into the HA cluster. Critical applications may then be moved (342) from the node being replaced, and then the node being replaced may be removed from the cluster and have its status changed to the repair (out-of-service) status (344).

Figure 4A:
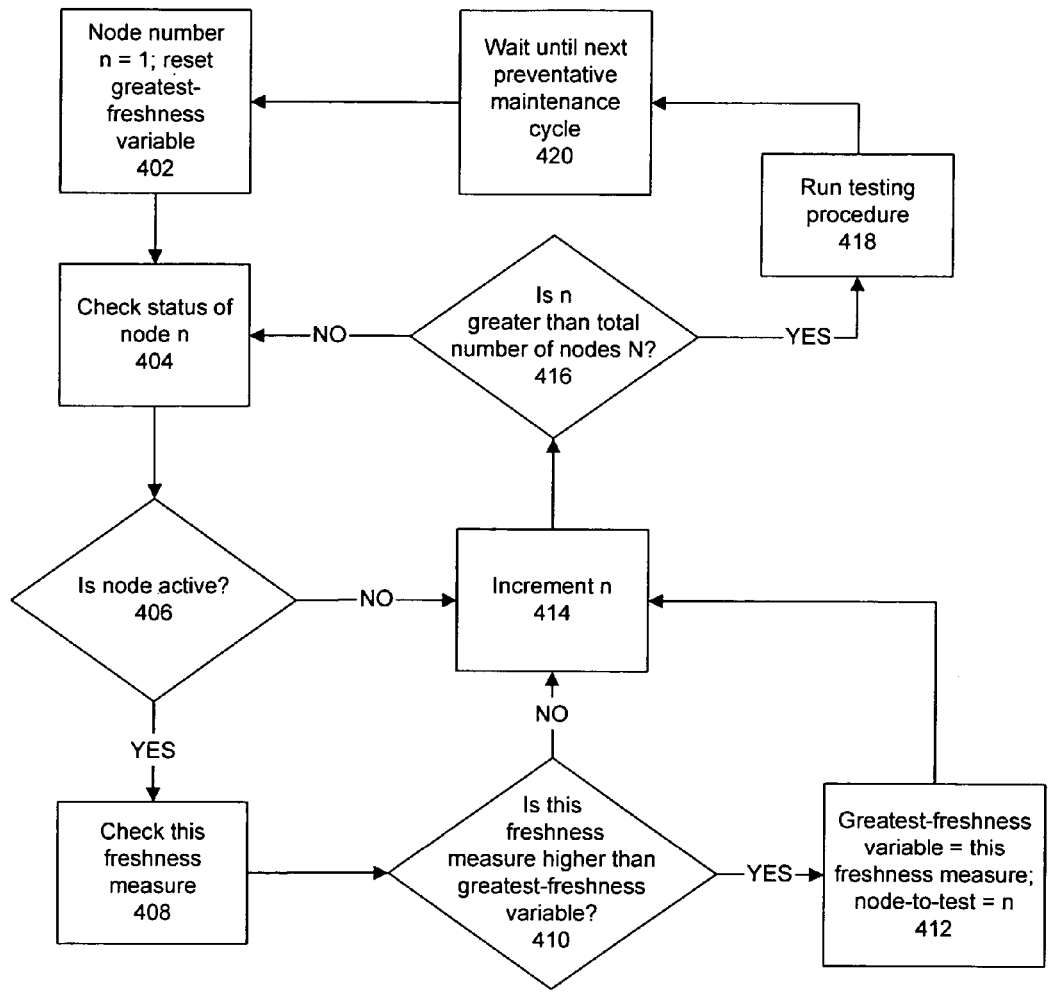
FIG. 4A is a flow chart depicting a method of performing preventative maintenance in accordance with an embodiment of the invention.

FIG. 4A is a flow chart depicting a method of performing preventative maintenance in accordance with an embodiment of the invention. A cycle of this "preventative maintenance" task (400) may be periodically (420) performed by the cluster master 102. The frequency of performance of the preventative maintenance task may be configurable.

For each task cycle, the method (400) goes through all the nodes 104. The node 104 assigned the number 1 is set (402) to be the first in the illustrated example of FIG. 3, but other orders of the nodes may be followed instead. In addition, a greatest-freshness variable is reset, for example, to zero. For each node "n", the status is checked (404) by examining the status data stored in the data storage 120 associated with the cluster master 102. If the status indicates that the node n is not "active" (406), then the process moves on to the next node. Moving onto the next node may involve, for example, incrementing (414) the node number n and checking status of the next node (404), so long as there are more nodes to check (416).

If the status indicates that the node n is active (406), then the cluster master 102 checks (408) the freshness measure for the node n as stored 120. The freshness measure for the node n is compared with the value of the greatest-freshness variable. If the freshness measure for this node is greater than the value of the greatest-freshness variable, then the greatest-freshness variable is replace with the freshness measure for this node, and the node-to-test is set to be node n (412). On the other hand, if the freshness measure for this node is not greater than the value of the greatest-freshness variable, then the method (400) moves onto the next node, for example, by incrementing n (414) and checking status of the next node (404), so long as there are more nodes to check (416). When there are no more nodes to check, then the node-to-test should be the active node with the highest freshness measure, i.e. the least fresh node.

When all the nodes have been checked (416), then a testing procedure is run (418). An example of the testing procedure (418) is discussed in further detail below in relation to FIG. 4B.

Figure 4B:
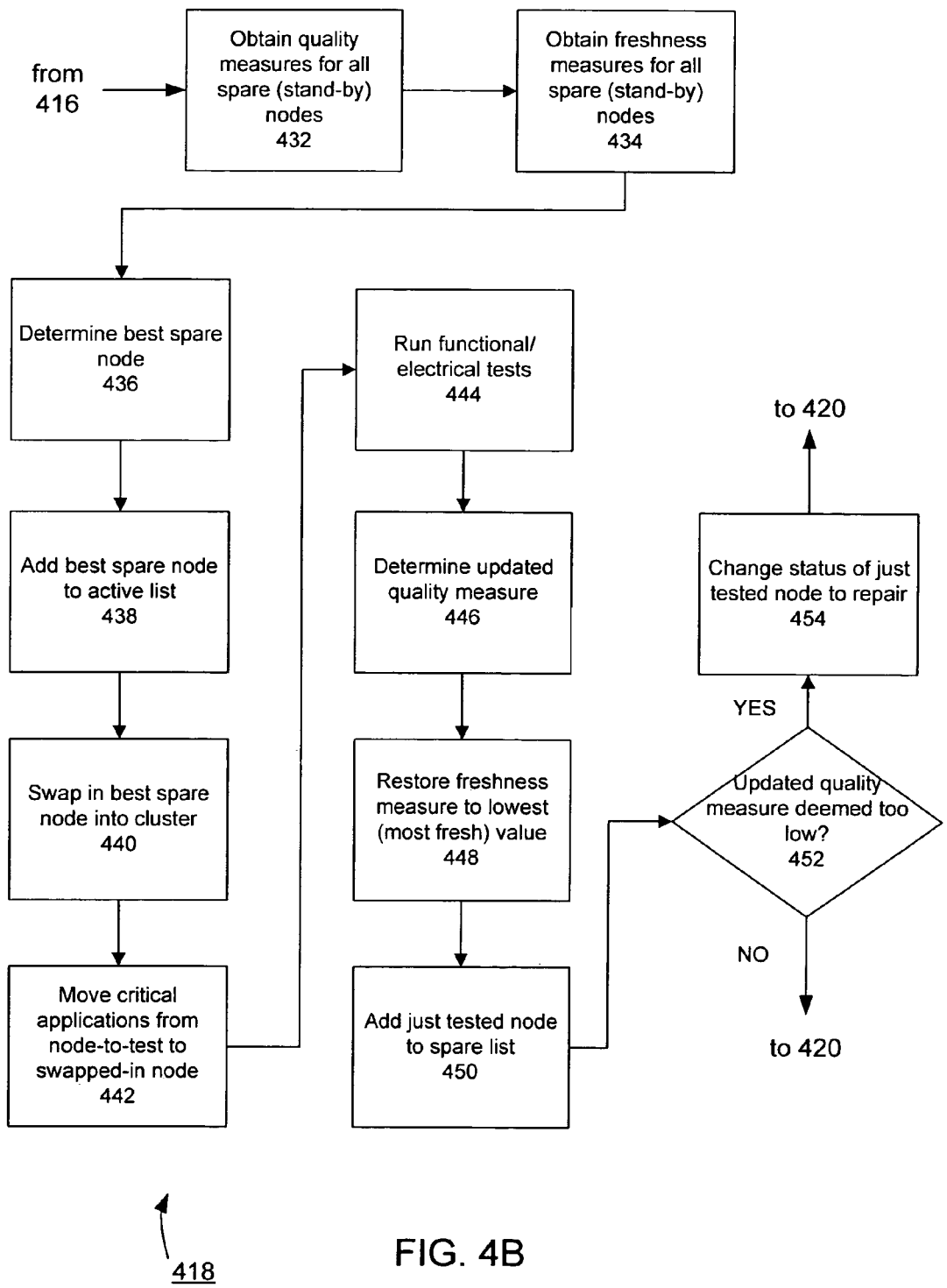
FIG. 4B is a flow chart depicting a testing procedure in accordance with an embodiment of the invention.

FIG. 4B is a flow chart depicting a testing procedure (418) in accordance with an embodiment of the invention. This testing procedure (418) relates to the testing of a node-to-test from the set of active nodes 110. For example, the node-to-test may be determined by the preventative maintenance method (400) discussed above in relation to FIG. 4A.

Quality measures (432) and freshness measures (434) are obtained by the cluster master 102 from the stored quality/freshness data 120 for all spare (standby) nodes 112. While FIG. 4B depicts the quality measures being obtained first, then the freshness measures being obtained, the measures may be obtained not necessarily in that order.

Using the quality and freshness data, a determination is made as to the "best" spare node (436). This determination may be made using various techniques or formulas. For example, the best spare node may be the spare node that is the most fresh with a satisfactory quality measure, where the satisfactory quality measure is no greater than a maximum allowable. As another example, the best spare node may be the spare node that is of best quality with a satisfactory freshness, where a satisfactory freshness measure is no greater than a maximum allowable. As another example, the quality and freshness measures may be averaged for each spare node, and the spare node with the lowest average (best combined quality and freshness) may be chosen. The averaging may be weighted in favor of either the quality or the freshness measure. Other formulas may also be used.

Once the best spare node has been determined (436), the best spare node may be added (438) to the active list of the cluster (changing the node's status to active) and then swapped (440) into the HA cluster. Critical applications may then be moved (442) from the node-to-test to the swapped-in node.

The node-to-test may then have its status changed to the under-test status, and functional and/or electrical tests (preferably both) may be run on the node-under-test (444). The tests may involve use of "worst-case" type data patterns and other stresses to probe the functionality and robustness of the node being tested. From the test results, a new or updated quality measure for the node is determined (446).

With the node having just been retested, the freshness measure is restored (448) to the lowest (most fresh) value. The just tested node is then added (450) to the spare (standby) list (changing the node's status to spare). However, if the just tested node had an updated quality measure deemed too poor or "bad" (for example, having a quality measure above a maximum allowable value) (452), then the status of the just tested node may be changed (454) to repair (out-of-service).

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A high-availability cluster apparatus, the apparatus comprising:
   a plurality of computing nodes of said cluster;
   a cluster master communicatively connected to each of the nodes;
   non-volatile memory associated with the cluster master, wherein the non-volatile memory is configured to store data keeping track of quality measures of the nodes; and
   computer-executable code of the cluster master configured to periodically execute a preventative maintenance task to test a least-recently tested active node so as to proactively maintain the cluster, wherein the preventative maintenance task is configured to swap out a least-recently-tested active node from the HA cluster and swap in a best-available spare node into the HA cluster, run functional tests on the least-recently-tested active node after that node is swapped out of the HA cluster such that the least-recently-tested node becomes a just-tested node, and restore a freshness measure of the just-tested node to a most fresh value and to change the status variable of the just-tested node to a spare status.

2. The apparatus of claim 1, wherein the non-volatile memory is further configured to store data keeping track of freshness measures of the nodes.

3. The apparatus of claim 2, wherein the cluster master is configured to keep track of status variables of the nodes.

4. The apparatus of claim 1, wherein the cluster master comprises a separate computing system from the nodes of the cluster.

5. The apparatus of claim 1, wherein the cluster master comprises an application that is distributed over the nodes of the cluster.

6. The apparatus of claim 1, further comprising:
   point-to-point links between input/output interfaces of the cluster master and each of the nodes.

7. The apparatus of claim 1, further comprising:
   a network interconnecting input/output interfaces of the cluster master and each of the nodes.

8. The apparatus of claim 3, further comprising:
   computer-executable code of the cluster master configured to periodically execute a gather task so as to determine the status variable and the quality and freshness measures for each node.

9. The apparatus of claim 8, further comprising:
   computer-executable code of the cluster master configured to periodically execute a quality check task so as to check the quality measure of each active node.

10. The apparatus of claim 9, wherein the quality check task is configured to replace a poor-quality active node with a best-available spare node.

11. A method of pro-actively maintaining a high-availability (HA) cluster having a plurality of nodes, the method comprising:
    keeping track of status variables for the nodes;
    keeping track of quality measures for the nodes;
    keeping track of freshness measures for the nodes; and
    periodically executing a preventative maintenance task to test a least-recently-tested active node,
    wherein the preventative maintenance task is configured to swap out the least-recently-tested active node from the HA cluster and swap in a best-available spare node into the HA cluster, run functional tests on the least-recently-tested active node after that node is swapped out of the HA cluster such that the least-recently-tested node becomes a just-tested node, and restore a freshness measure of the just-tested node to a most fresh value and to change the status variable of the just-tested node to a spare status.

12. The method of claim 11, wherein the status variables, quality measures, and freshness measures are kept track of by periodically executing a gather data task by a cluster master.

13. The method of claim 11, further comprising:
    periodically executing a quality check task to maintain a quality level of active nodes in the HA cluster.

14. The method of claim 13, wherein the quality check task is configured to replace a poor-quality active node with a best-available spare node.

15. The method of claim 11, wherein the preventative maintenance task is configured to determine the least-recently-tested active node by utilizing the freshness measures.

16. The method of claim 11, wherein the preventative maintenance task is further configured to change the status variable of the just-tested node to a repair status if the just-tested node failed the functional tests.

17. A method of preventative maintenance of a high-availability (HA) cluster, the method comprising:
   determining a least-recently-tested active node;
   swapping out the least-recently-tested active node from the HA cluster;
   swapping in a stand-by node into the HA cluster;
   executing functional tests on the least-recently-tested active node after that node is swapped out of the HA cluster such that the least-recently-tested node becomes a just-tested node;
   restoring a freshness measure of the just-tested node to a most fresh value; and
   changing a status variable of the just-tested node to a stand-by status.

18. The method of claim 17, further comprising:
   changing the status variable of the just-tested node to a repair status if the just-tested node failed the functional tests.

* * * * *